United States Patent
Rongo et al.

[11] Patent Number: 6,060,853
[45] Date of Patent: May 9, 2000

[54] REMOVABLE ROBOTIC SENSOR ASSEMBLY

[75] Inventors: Robert Rongo, Danville; Michael J. Saunders, Indianapolis, both of Ind.

[73] Assignee: Cybo Robots, Inc., Indianapolis, Ind.

[21] Appl. No.: 09/146,876

[22] Filed: Sep. 3, 1998

Related U.S. Application Data

[60] Provisional application No. 60/057,807, Sep. 4, 1997.

[51] Int. Cl.[7] .................................................. B25J 19/02
[52] U.S. Cl. ........................................ 318/568.16; 901/46
[58] Field of Search ........................ 318/568.11, 568.16; 901/9, 10, 41, 42, 43, 46

[56] References Cited

U.S. PATENT DOCUMENTS

| | | |
|---|---|---|
| 3,594,540 | 7/1971 | Weinfurt . |
| 4,046,263 | 9/1977 | Cwycyshyn et al. . |
| 4,215,299 | 7/1980 | Edwin et al. . |
| 4,492,847 | 1/1985 | Masaki et al. . |
| 4,724,301 | 2/1988 | Shibata et al. . |
| 4,883,939 | 11/1989 | Sagi . |
| 5,010,228 | 4/1991 | Nishiwaki . |
| 5,067,225 | 11/1991 | Angelo, Jr. et al. ........................ 29/451 |
| 5,394,513 | 2/1995 | Sgarbi et al. ............................. 395/80 |
| 5,715,375 | 2/1998 | Ito et al. ................................... 395/93 |

*Primary Examiner*—Bentsu Ro
*Attorney, Agent, or Firm*—Maginot, Addison & Moore

[57] ABSTRACT

A removable robotic sensor assembly is removably coupled to a robotic arm having a work tool secured thereto. The removable robotic sensor assembly includes a sensor for obtaining data from a work piece. The removable robot sensor assembly further includes a gripper assembly coupled to the sensor. The gripper assembly operable to alternately couple to and decouple from at least one of the work tool and the robotic arm when said work tool is secured to the robotic arm. The gripper assembly and said sensor form a sensor assembly.

27 Claims, 6 Drawing Sheets

REMOVABLE ROBOTIC SENSOR ASSEMBLY

CROSS REFERENCE TO RELATED APPLICATION

This application claims to benefit of U.S. Provisional Application Ser. No. 60/057,807, filed Sep. 4, 1997.

GOVERNMENT LICENSE

The U.S. Government has a paid-up license in this invention and the right in limited circumstances to require the patent owner to license others on reasonable terms, as provided by the terms of Government Contract DTMA 91-94-H-00019, awarded by the U.S. Department of Transportation, Maritime Administration.

FIELD OF THE INVENTION

The present invention relates generally to robots, and in particular, to robots that employ work tools to perform automated work operations.

BACKGROUND OF THE INVENTION

Robots are employed in a variety of industrial work operations, and excel in operations that require a high amount of precision and consistency. Exemplary robotic work operations include welding, cutting, grinding, and painting. To perform a particular operation, a specified work tool is typically mounted to an operative end of a robot arm.

For example, a welding torch is mounted onto a robot arm to enable robotic welding operations. Welding operations require precision movements that are particularly well-suited for robotic manipulation. Accordingly, robots have been increasingly used for welding purposes.

One difficulty encountered in robotic work operations, including welding operations, arises from tolerances in aligning and fixturing work pieces. In particular, if a work piece is even slightly misaligned, the robot must be reconfigured to account for the misalignment. To overcome this difficulty, robotic systems often employ a control mechanism that adjusts the robotic work operation to compensate for alignment and fixturing tolerances. A common control mechanism is an optical sensor with a feedback control circuit. The optical sensor obtains information about the work piece alignment and the feedback control circuit uses the information to adjust the work operation accordingly.

A key element of the control system described above lies in the ability of the optical sensor to obtain data from the work piece. In welding operations, for example, the optical sensor must be manipulated by the robot to observe the weld zone and surrounding areas. To this end, prior art systems employ an optical sensor that is directly and permanently mounted on the torch. For example, U.S. Pat. Nos. 3,594, 540, 4,215,299, and 4,624,301 show robotic welders having sensing devices permanently affixed to the welder. Such a design allows the sensor to always be available. However, there are several drawbacks to mounting the sensor permanently to work tool. First, sensors tend to be bulky, and can restrict access and articulation of the robot arm during a welding operation. Second, certain work operations can damage the sensor. For example, welding operations produces fumes, spatter, and heat which can damage a sensor when mounted on or near the welding torch.

A solution that overcomes the shortcomings of permanently mounting the sensor to the welding torch is a solution in which the work tool is interchanged with a sensor unit. Specifically, the robot may pick up the sensor, move the sensor to a position in which it can gather data, replace the sensor on a docking device, and then pick up and manipulate the work tool. A disadvantage of interchanging the welding torch or work tool with the sensor is that the interchange process is time consuming. In particular, the discrete steps of picking up and setting down the work tool and picking up and setting down the sensor increases the time required to complete the work operation.

What is needed, therefore, is an apparatus and method for mounting a sensor to a work tool attached to a robot arm which overcome one or more of the above-mentioned drawbacks.

SUMMARY OF THE INVENTION

The present invention addresses the above needs, as well as others, by providing a method and apparatus for removably coupling a sensor to the robot arm (or work tool) while the work tool remains secured to the robot arm. The sensor is coupled to the robot arm to facilitate sensor operations and decoupled from the robot arm to facilitate work operations. By removably coupling the sensor to the robot arm while the work tool is secured to the robot arm, the robot can easily move between a work operation and a sensor operation without the need to decouple the work tool from the robot arm, and without subjecting the sensor device to the potentially damaging environment of the actual work operation.

In accordance with a first embodiment of the present invention, there is provided a removable robotic sensor assembly for use in connection with a robotic arm having a work tool secured thereto. The removable robotic sensor assembly includes a sensor for obtaining data from a work piece. The removable robot sensor assembly further includes a gripper assembly coupled to the sensor. The gripper assembly operable to alternately couple to and decouple from at least one of the work tool and the robotic arm when said work tool is secured to the robotic arm. The gripper assembly and said sensor form a sensor assembly.

In accordance with a second embodiment of the present invention, there is provided a method of performing an operation on a work piece using a robotic arm having a work tool secured thereto. The method includes the steps of coupling a sensor assembly to at least one of the robotic arm and the work tool and employing the robotic arm to move the sensor assembly to allow the sensor assembly to obtain data regarding the work piece. The method further includes the steps of removing the sensor assembly from the at least one of the robotic arm and the work tool and employing the robotic arm to move the work tool to perform a work operation on the work piece based in part on the obtained data.

This invention has the advantage of allowing the robot move between work operations and sensing operations without the need to decouple the work tool from the robot arm. After the sensing operation is performed, the sensor is decoupled from the work tool or the robot arm and the robot arm can maneuver the work tool in a work operation without the sensor. One embodiment of the present invention has the further advantage of providing a docking assembly for receiving and holding the sensor when the work tool is being used for the work operation.

The above features and advantages, as well as others, will become readily apparent to those of ordinary skill in the art by reference to the following detailed description and accompanying drawings.

DETAILED DESCRIPTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention. For example, while the embodiment described herein shows a welding torch on a robot arm having a removable sensor assembly, the torch may readily be replaced by another tool, such as one used for cutting, gouging, labeling, gluing, grinding, painting, and the like.

Figure 1:
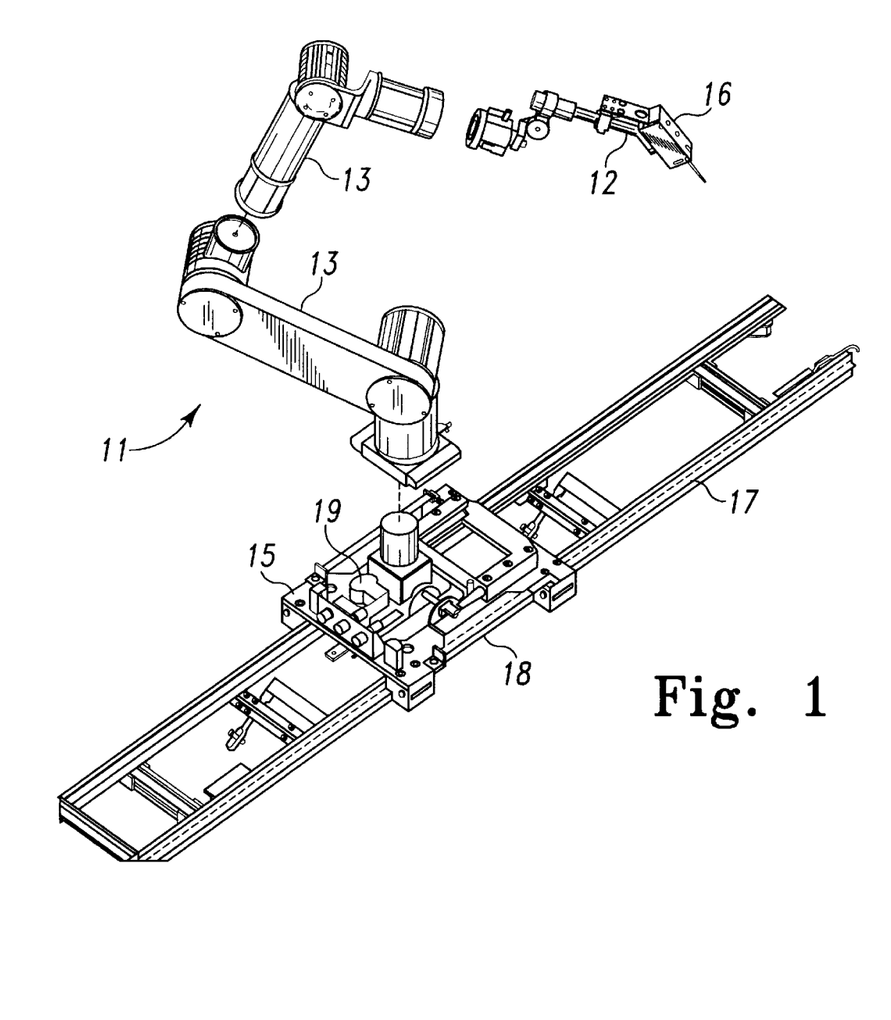
FIG. 1 is a partially exploded view of a robot arm with a work tool and a sensor assembly attached thereto which incorporates the features of the present invention.

Referring now to FIG. 1, there is shown an exemplary environment of the present invention. A robot 11 includes a robot arm 13 secured to a robot base 15. The robot arm 13 is operable to move along at least three axes, and can be oriented along at least three axes. The robot base 15 is operable to move the robot 13 along a track 17. It should be appreciated that the robot base 15 could in other implementations be a non-movable structure, or movable structure that could move without the constraint of the track 17.

A work tool, such as a welding torch 12, is secured to robot arm 13. The robot arm 13 maneuvers the welding torch 12 to perform any one of a number of work operations. A removable sensor assembly including a sensor assembly 16 and a docking assembly 18 are also shown in FIG. 1. The sensor assembly 16 in FIG. 1 is shown coupled to the welding torch 12 and decoupled from the docking assembly 16 as would be necessary to carry out a sensing operation. To carry out a work operation, the sensor assembly 16 would be decoupled from the torch 12 and coupled to the docking assembly 18.

The robot 11 further includes a controller 19. The controller 19 is operable to control various aspects of the operation of the robot 11, including robot motion. The robot controller 19 is further operable to control the sequencing and timing of operations of the removable sensor assembly.

Figure 2:
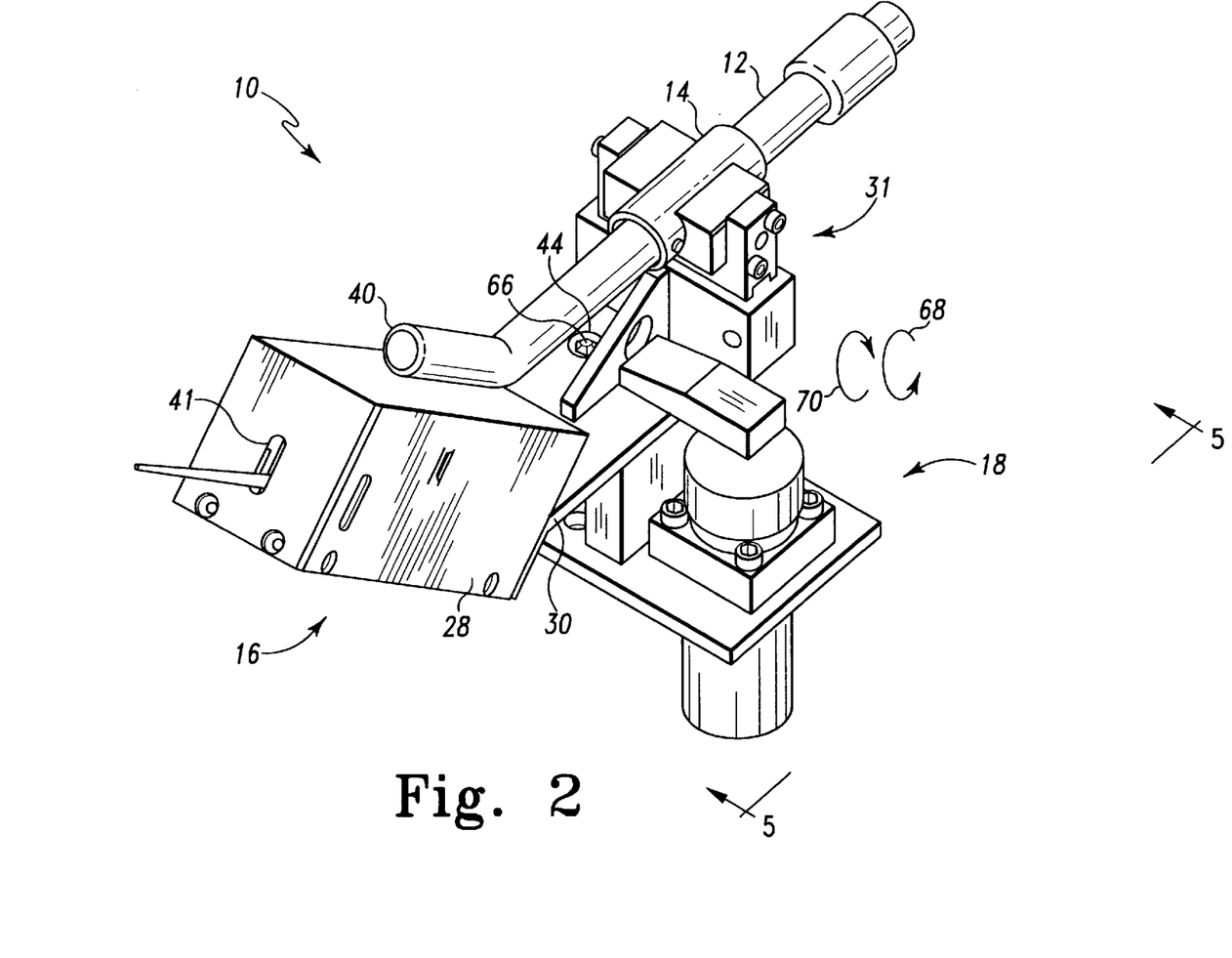
FIG. 2 is a perspective view of a removable robotic sensor assembly according to the present invention coupled to a welding torch.

Referring now to FIG. 2, there is shown in further detail an exemplary embodiment of the removable sensor assembly 10 which incorporates the features of the present invention. The removable sensor assembly 10 includes a pin collar assembly 14, a sensor assembly 16 and a docking assembly 18. The torch 12 of the robot arm 13 (shown in FIG. 1) is also shown in FIG. 2.

Figure 3:
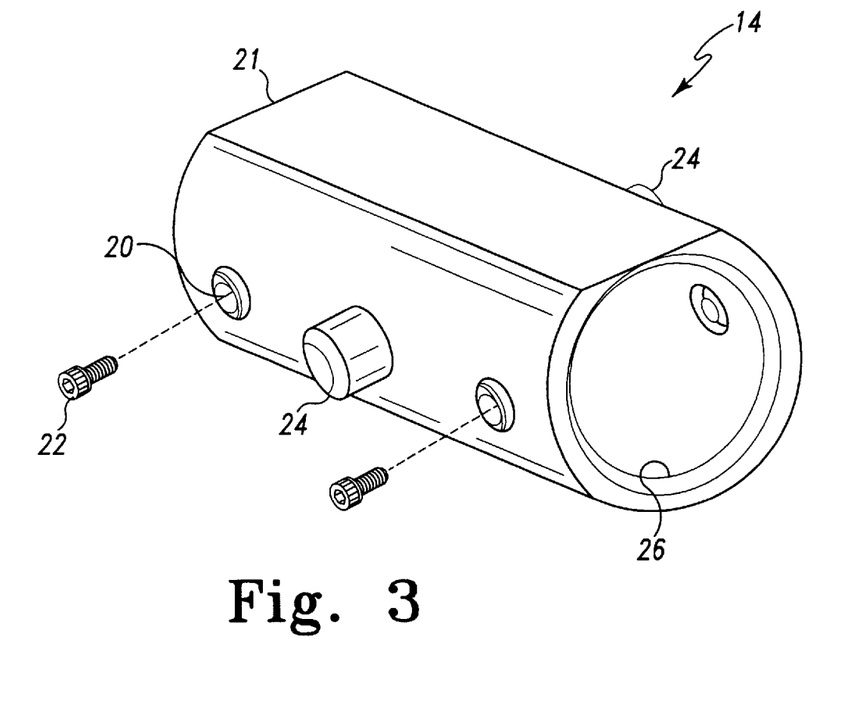
FIG. 3 is an enlarged perspective view of a pin collar assembly shown in FIG. 2.

Referring now to FIG. 3, the pin collar assembly 14 includes a collar 21, set screws 22, and a first mating feature, which in the exemplary embodiment described herein, are a set of collar pins 24. The collar 21 has a cylindrical passage 26 defined therein. The collar 21 also has four screw apertures 20 defined therein. The screw apertures 20 are each threaded to allow one of the set screws 22 to be rotatably inserted. The collar pins 24 are securely affixed to and extend radially outward from the collar 21. The collar pins 24 are aligned along an axis that substantially bisects the cylindrical passage 26.

The purpose of the pin collar assembly 14 is to provide a registration means for attachment and precise as well as repeatable alignment of the sensor assembly 16 to the torch 12. Specifically, the first mating feature or set of collar pins 24 is configured to cooperate with a second mating feature on the sensor assembly 16, discussed further below, to insure that the sensor assembly 16 is repeatably aligned in a precise predetermined relationship with respect to the torch 12 and robot arm 13.

Figure 4:
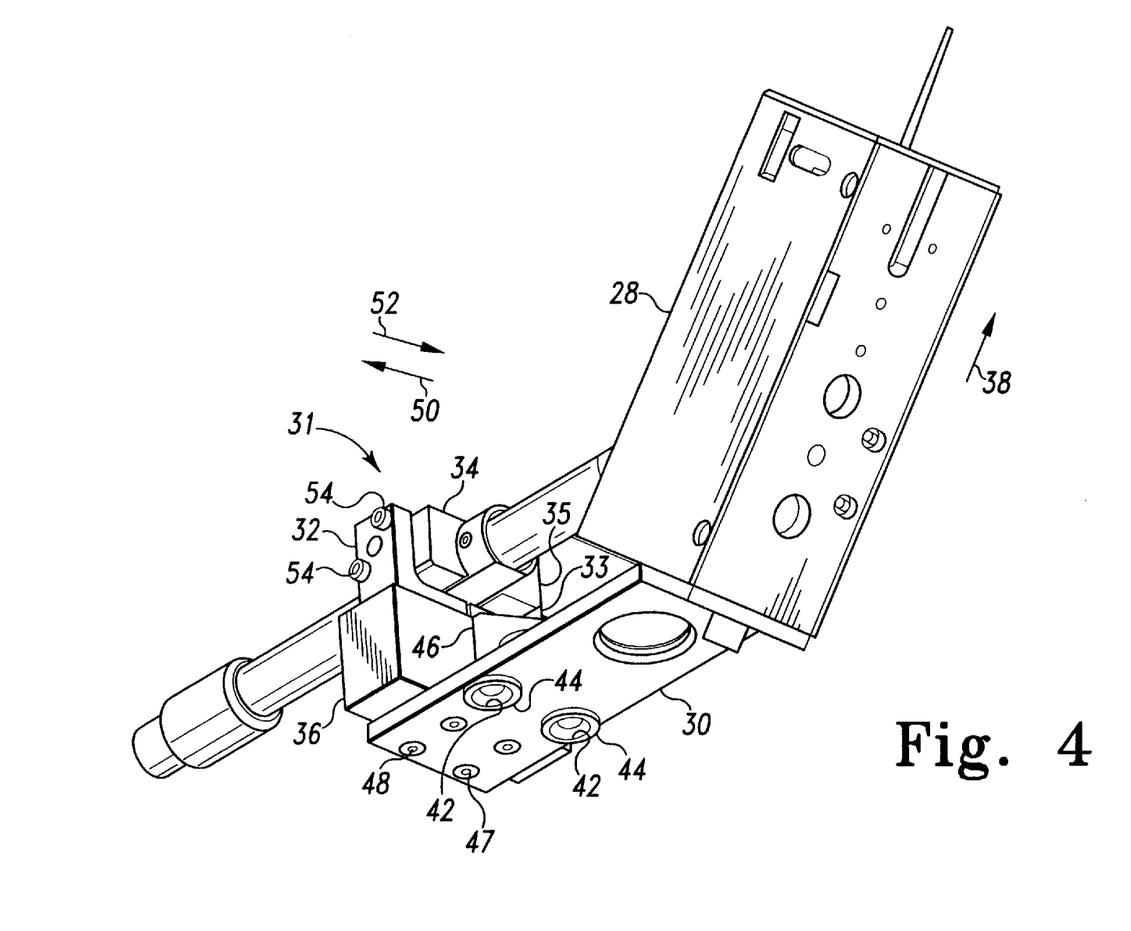
FIG. 4 is a perspective view of the bottom of the torch and sensor assembly removed from the docking assembly.

The pin collar assembly 14 is mounted to the torch 12 of FIG. 2 in the manner described below. Referring to FIGS. 3 and 4 contemporaneously, the pin collar assembly 14 is first positioned onto the torch 12. In particular, the torch 12 is placed in the cylindrical passage 26 of the collar 21. To ensure precise alignment of the pin collar 21 on the torch 12, the pin collar 21 is affixed to the torch 12 in a separate alignment fixture, not shown. The alignment fixture enables the pin collar 21 to be consistently aligned with any subsequent replacement torches.

The pin collar assembly 14 is preferably glued to the torch 12. While the glue sets up, the set screws 22 are rotatably inserted in the screw apertures 20 until the set screws 22 contact the torch 12 and apply a frictional force thereto. The frictional force of the set screws 22 affixes the pin collar assembly 14 to the torch 12 until the glue dries. As a result, the collar pins 24 of the collar 21 are affixed in a predetermined registration position with respect to the torch 12, each collar pin 24 extending from each side of the torch 12.

It will be noted that the use of the collar pins 24 and the pin collar assembly 14 is given by way of example only. Other structures may be employed as the first mating feature which serves to cooperate with the second mating feature on the sensor assembly 16 to provide a precise registration between the robot arm 13 and the sensor 16. Such structures may include integral structures of the torch itself, or even structures on the robot arm.

Referring now to FIG. 2 and 4, the sensor assembly 16 includes a sensor 28, a bracket 30, and a gripper assembly 31. In the exemplary embodiment, the sensor 28 is an optical sensor. For example, the sensor 28 may suitably be a sensor such as the one described in U.S. patent application Ser. No. 08/878,252, which is assigned to the assignee of the present invention and incorporated herein by reference. It will be appreciated, however, that the optical sensor may readily be replaced by and alternative sensing means having a comparable physical envelope.

The sensor 28 includes a sensor aperture 41. In the exemplary embodiment described herein, the sensor 28 is mounted to the bracket 30 such that the sensor aperture 41 is substantially aligned with the torch tip 40 in the general direction of arrow 38 (shown in FIGS. 4 and 5). In other words, the sensor bracket 30 is designed to align the sensor 28 in a parallel relationship with the torch 12. It will be noted that other alignment relationships between the sensor 28 and the torch 12 may be used to accommodate particular implementation needs. Those of ordinary skill in the art may readily modify the sensor bracket 30 to provide such alignment relationships.

The bracket 30 further includes two bushing apertures 42 defined therein for receiving a first alignment mechanism or bushings 44. The bushings 44 are used to align the sensor assembly 16 with the docking assembly 18. The bracket 30 further includes four fastener apertures 47 defined therein.

The gripper assembly 31 in the exemplary embodiment described herein includes a gripper body 36, a left jaw 32, an opposing right jaw 33, a left jaw pad 34, and a right jaw pad 35. The gripper body 36 includes a pneumatic actuator operably coupled to cause the left jaw 32 and the right jaw 33 to alternately move toward each other and away from each other. The gripper body 36 may suitably be a model RPL-2 pneumatic gripper available from Robohand, Inc. of Monroe, Conn. It will be noted, however, that the gripper assembly 31 may alternatively include another kind of actuator, including but not limited to an electrical or hydraulic actuator.

The gripper body 36 is secured to the bracket 30 by four fasteners 48 that are inserted through the fastener apertures 47 and secured to the gripper body 36. The gripper body 36 is further secured to the bracket 30 by a gusset 46. In particular, the gusset 46 is welded to both the bracket 30 and the gripper body 36. It should be appreciated that one skilled in the art could substitute a suitable alternative mechanism that is operable to alternately couple to and decouple the sensor assembly 16 from at least one of the welding torch 12 and the robotic arm 13 as an alternative for the specific embodiment of the gripper assembly 31 described herein.

The first jaw pad 34 is attached to the left jaw 32. Specifically, the first jaw pad 34 has two fastener apertures 56 defined therein (see FIG. 6). One of a plurality of the fasteners 54 (see FIG. 4) is inserted through the left jaw 32 and each jaw pad aperture 56 of the first jaw pad 34, thus securing the first jaw pad 34 to the left jaw 32.

Figure 5:
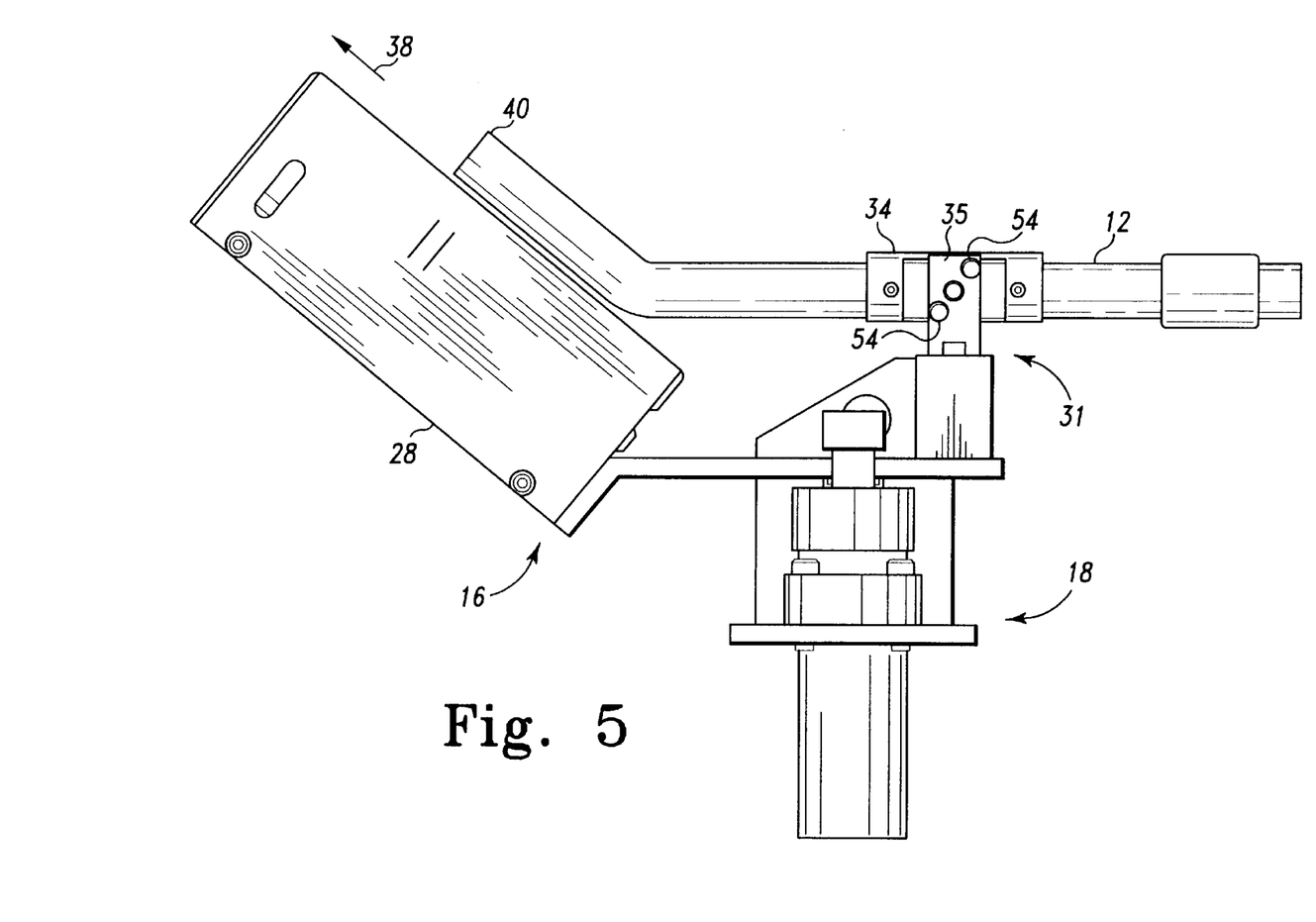
FIG. 5 is a side elevational view of the torch and removable sensor assembly taken along the line 5—5 of FIG. 2.
Figure 6:
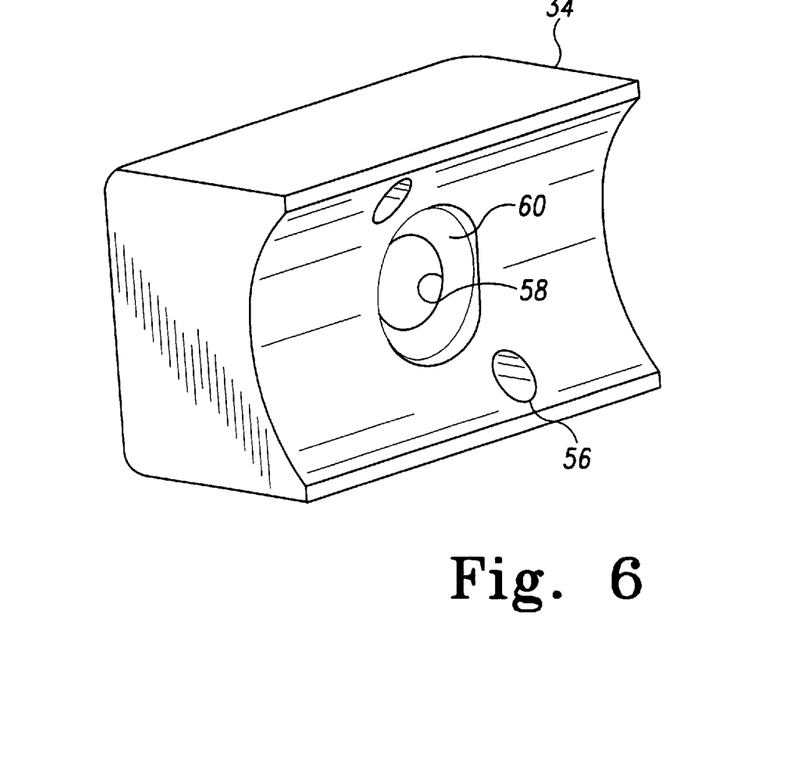
FIG. 6 is an enlarged perspective view of the jaw pad shown in FIG. 5.

Referring to FIG. 6, the first jaw pad 34 further includes a second mating feature or pin receiving hole 58 and a beveled section 60 within the pin receiving hole 56. The second mating feature or pin receiving hole 58 of the jaw pad 34 is advantageously sized to receive one of the first mating features or collar pins 24 of the pin collar 14 (see FIG. 3) when gripper jaw pad 34 engages the collar assembly 14. It further should be appreciated that a second jaw pad 35, which is substantially identical to the first jaw pad 34, is attached to the right jaw 33 in a similar manner (see FIG. 5).

Figure 7:
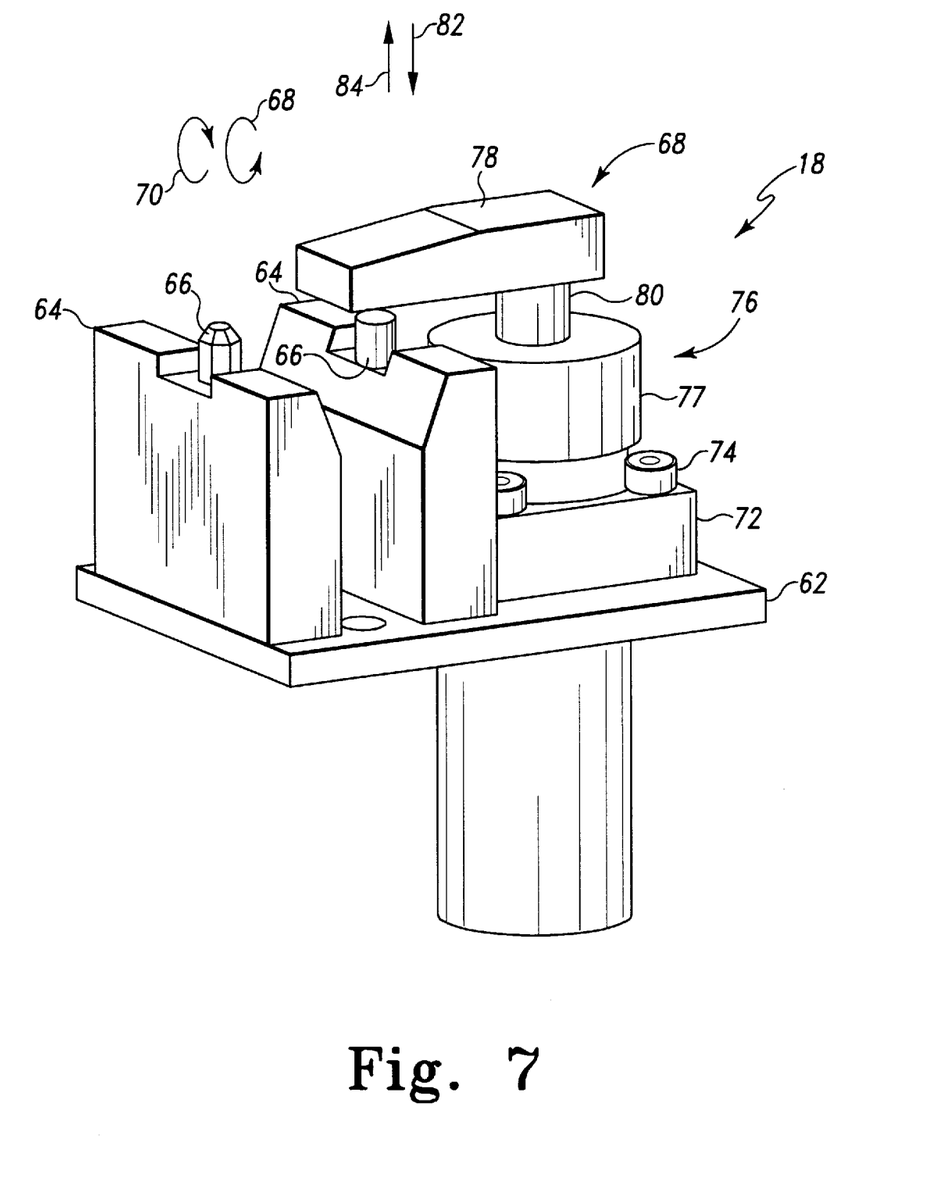
FIG. 7 is a perspective view of the docking station shown in FIG. 2 with the torch and removable sensor assembly removed.

Referring now to FIG. 7, the docking assembly 18 includes a docking support 62, two upright supports 64, a second alignment mechanism or two locating pins 66, and a swing clamp assembly 68. Each of the upright supports 64 is coupled at one end to the docking support 62. The other end of each of the upright supports 64 is coupled to the locating pin 66.

The swing clamp assembly 68 includes a swing clamp 76 and a stationary mounting block 72. The mounting block 72 is permanently affixed to the swing clamp 76. The mounting block 72 in secured to the docking support 62 by a plurality of fasteners 74. Thus, docking support 62 is attached to the swing clamp 76.

The swing clamp 76, which may suitably be a series 8000 pneumatic swing clamp available from De-Sta-Co, of Troy, Mich., includes a clamp body 77, a piston shaft 80, and a swing arm 78. One end of the piston shaft 80 is attached to the clamp body 77 in a manner that permits helical movement of the piston shaft 80 within the clamp body 77. The other end of the piston shaft 80 is securely attached to the swing arm 78.

It is noted that the swing clamp 76 need not be a pneumatic swing clamp, but may alternatively be another clamping mechanism using an electrical or hydraulic actuators or the like.

Industrial Applicability

It is noted that the controller 19 (see FIG. 1) is operably connected to provide signals to control the operations of the sensor assembly 16, the docking assembly 18, and the robot 11. Accordingly, in the exemplary embodiment described herein, the operations described below are carried out under the control of the controller 19.

In operation, the removable sensor assembly 10 alternately couples and decouples the sensor assembly 16 to and from the torch 12. Specifically, the sensor assembly 16 is coupled to the torch 12 to facilitate sensor operations in which optical measurement of the work pieces may occur. After completion of the sensor operations, the sensor assembly 16 is decoupled from the torch 12 and positioned on the docking assembly 18. The sensor assembly 16 is then coupled to the docking assembly 18. The above operations are described in further detail below.

Prior to a sensor operation, the torch 12 moves independently of the sensor assembly 16. At that point, the sensor assembly 16 is coupled to the docking assembly 18. To this end, the swing arm 78 applies a force to the bracket 30, thereby securing the sensor assembly 16 to the docking assembly 18. When the sensor assembly 16 is coupled to the docking assembly 18, each of the second alignment mechanism or alignment pins 66 of the docking assembly 18 is positioned the corresponding first alignment mechanism or bushing 44 of the sensor assembly 16 (as shown in FIGS. 2 and 5). It should be appreciated that the use of the alignment pins 66 and the bushings 44 as the first and second alignment mechanisms are given by way of example only, and one skilled in the art could substitute any suitable alternative first alignment and second alignment mechanism capable of registering the sensor assembly 16 in a predetermined position on the docking assembly 18.

When it is desired to use the sensor 28, the sensor assembly 16 must be coupled to the torch 12 and decoupled from the docking assembly 18. Coupling the sensor assembly 16 to the torch 12 includes the following steps: (1) aligning the torch 12 with the sensor assembly 16, (2) actuating the gripper assembly 31 to position the gripper assembly 31 in the closed position, and (3) moving the swing clamp assembly 76 from its clamped position to its unclamped position.

In particular, to align the torch 12 with the sensor assembly 16, the robot arm 13 positions the torch 12 such that each of the first mating features or collar pins 24 of the torch 12 are aligned with the corresponding second mating feature or pin receiving holes 58 on the jaw pad 34 and the jaw pad 35 of the gripper assembly 31.

To place the gripper assembly 31 in the closed position, the gripper body 36 advances the left jaw 32 in the general direction of arrow 52, and advances the right jaw 33 in general direction indicated by arrow 50 of FIG. 4. As the pin receiving holes 58 approach the collar pins 24, the beveled section 60 cooperates with the collar pins 24 to align the torch 12 in precise registration with respect to the sensor assembly 16. Such precise registration reduces errors in the measurements taken by sensor 28.

When the gripper assembly 31 reaches the fully closed position, the torch 12 is coupled to the sensor assembly 16. At this point, the torch 12, the sensor assembly 16, and the docking assembly 18 are all non-movably coupled.

The swing clamp 76 then moves from the clamped position to unclamped position. To this end, the piston shaft 80 moves upward in the general direction of arrow 84 and rotates counterclockwise in the general direction of the arrow 68 of FIG. 2, following a helical path. As a result, the swing arm 78 moves up and away from the upright supports 64 of the docking assembly 18. When the swing clamp 76 is in the unclamped position, the docking assembly 18 is no longer coupled to the sensor assembly 16. Thus, the sensor assembly 16 is coupled only to the torch 12 and is freely moved by the robot arm 13 (shown in FIG. 1).

The robot arm 13 then maneuvers the torch 12 and the sensor assembly 16 through a number of sensor operations. Such sensor operations include operations which the sensor 28 obtains data regarding the work pieces, not shown. Such data may include positioning and alignment data. Such data may be provided to the robot controller 19 which may then adjust subsequent robotic movements based on the positioning and alignment data. An example of a robot controller that adjusts robotic movements and other robotic work parameters based on data obtained by a sensor may be found in U.S. patent application Ser. No. 09/030,075, which is assigned to the assignee of the present invention and is incorporated herein by reference.

Once the sensor operations are completed, the sensor assembly 16 is returned to the docking assembly 18. Disengaging or decoupling the sensor assembly 16 from the torch 12 and coupling the sensor assembly 16 to the docking assembly 18 includes the following steps, (1) aligning the sensor assembly 16 with the docking assembly 18, (2) moving the swing clamp assembly 76 from the unclamped position to the clamped position, and (3) positioning the gripper assembly 31 in the open position.

In order to align the sensor assembly 16 with the docking assembly 18, each of the first alignment features or bushings 44 of the sensor assembly 16 is aligned with the corresponding second alignment feature or locating pins 66 of the docking assembly 18 (see FIGS. 2, 4 and 7).

Next, the swing clamp assembly 76 must be moved from the unclamped position to the clamped position, thereby placing the swing arm 78 in contact with the bracket 30 (see in FIGS. 2 and 5). To position the swing clamp assembly 76 in the clamped position, the swing arm 78 rotates clockwise in the general direction of arrow 70 (as shown in FIGS. 2 and 7), and moved downward in the general direction of arrow 82. As the piston shaft 80 moves in the direction of arrow 82, it applies a downward force. The downward force secures the sensor assembly 16 to the docking assembly 18. Each of the locating pins 66 of the docking assembly 18 cooperate with one of the bushings 44 of the sensor assembly 16 to insure that the sensor assembly 16 rests on the upright supports 64. As long as the swing arm 78 applies a downward force to the bracket 30, the sensor assembly 16 is securely coupled to the docking assembly 18.

To position the gripper assembly 31 in the open position, the gripper body actuates the left jaw 32 and the right jaw 33. Specifically, the gripper body 36 advances the left jaw 32 in the general direction of arrow 50, an advances the right jaw 33 in general direction indicated by arrow 52. The torch 12 is then free to 10 perform a number of work operations without the sensor assembly 16 attached.

In particular, the robot arm 13 (see FIG. 1) moves the torch 12 in a path determined by the robot controller to perform work operations on the work piece. The robot controller controls the movement of the robot arm 13 based partly on the data obtained by the sensor 28. For example, positioning data obtained by the sensor 28 may be used to define or at least modify the movements of the robot arm, as is known in the art.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

We claim:

1. A removable robotic sensor assembly for use in connection with a robotic arm having a work tool secured thereto, said removable robotic sensor assembly comprising:
    a) a sensor for obtaining data from a work piece; and
    b) a gripper assembly coupled to said sensor, said gripper assembly operable to alternately couple to and decouple from at least one of said work tool and said robotic arm when said work tool is secured to said robotic arm,
    wherein said gripper assembly and said sensor form a sensor assembly.

2. The removable robotic sensor assembly of claim 1, further comprising a docking assembly operable to couple and decouple from said sensor assembly, wherein said docking assembly is further operable to couple to said sensor assembly when said gripper assembly is decoupled from said at least one of said work tool and robotic arm.

3. The removable robotic sensor assembly of claim 2, wherein:
    said sensor assembly further includes a first alignment mechanism;
    said docking assembly further includes a second alignment mechanism;
    said first alignment mechanism is configured to engage said second alignment mechanism when said sensor assembly is coupled to said docking assembly.

4. The removable robotic sensor assembly of claim 3, wherein said first alignment mechanism and said second alignment mechanism include at least one locating pin and at least one bushing.

5. The removable robotic sensor assembly of claim 2, wherein:
    said docking assembly includes a swing arm, and
    said swing arm is operable to rotatably move into contact with said sensor assembly to secure said sensor assembly to said docking assembly.

6. The removable robotic sensor assembly of claim 1, wherein said gripper assembly includes first and second opposing jaws, said first and second opposing jaws configured to engage said at least one of said work tool and robotic arm.

7. The removable robotic sensor assembly of claim 6, wherein a first mating feature is secured to at least one of said work tool and robotic arm, and wherein:
    at least one of said first and second opposing jaws includes a second mating feature, said second mating feature configured to engage said first mating feature when said first and second opposing jaws engage said at least one of said work tool and robotic arm, thereby fixing said sensor assembly in a predetermined registration with respect to said robotic arm.

8. The removable robotic sensor assembly of claim 7, further comprising a collar assembly secured to at least one of said work tool and robotic arm, said collar assembly including said first mating feature.

9. The removable robotic sensor assembly of claim 8, wherein said first mating feature and said second mating feature comprise a pin and a pin receiving hole.

10. The removable robotic sensor assembly of claim 7, wherein said second mating feature comprises at least one of a pin and a pin receiving hole.

11. The removable robotic sensor assembly of claim 6, wherein said gripper assembly further comprises a pneumatic actuator coupled to said first and second opposing jaws, said pneumatic actuator operable to cause said first and second opposing jaws to alternately couple to and decouple from at least one of said work tool and said robotic arm.

12. The removable robotic sensor assembly of claim 1, wherein said sensor further comprises an optical sensor.

13. A method of performing an operation on a work piece using a robotic arm having a work tool secured thereto, the method comprising:

a) coupling a sensor assembly to at least one of the robotic arm and the work tool;

b) employing the robotic arm to move the sensor assembly to allow the sensor assembly to obtain data regarding the work piece;

c) removing the sensor assembly from said at least one of the robotic arm and the work tool; and d) employing the robotic arm to move the work tool to perform a work operation on the work piece based in part on the obtained data.

14. The method of claim 13 wherein the sensor assembly further comprises a sensor and a gripper assembly, and wherein:

step a) further comprises coupling the sensor assembly to said at least one of the robotic arm and the work tool using the gripper assembly, and step c) further comprises removing the sensor assembly from said at least one of the robotic arm and the work tool using the gripper assembly.

15. The method of claim 13 wherein step a) further comprises:

decoupling the sensor assembly from a docking assembly after the sensor assembly is coupled to said at least one of the robotic arm and work tool.

16. The method of claim 15 wherein step c) further comprises coupling the sensor assembly to the docking assembly before the sensor assembly is decoupled from said at least one of the robotic arm and work tool.

17. A robot assembly, comprising:

a) a robotic arm;

b) a work tool secured to said robotic arm;

c) a sensor for obtaining data from a work piece; and d) a gripper assembly coupled to said sensor, said gripper assembly operable to alternately couple to and decouple from at least one of said work tool and said robotic arm when said work tool is secured to said robotic arm, wherein said gripper assembly and said sensor form a sensor assembly.

18. The robot assembly of claim 17, further comprising a docking assembly operable to couple to and decouple from said sensor assembly, wherein said docking assembly couples to said sensor assembly when said gripper assembly is decoupled from said at least one of the work tool and robotic arm.

19. The robot assembly of claim 18, wherein:

said sensor assembly further includes a first alignment mechanism;

said docking assembly further includes a second alignment mechanism; and said first alignment mechanism is configured to engage said second alignment mechanism when said robot assembly is coupled to said docking assembly.

20. The robot assembly of claim 19, wherein said first alignment mechanism and said second alignment mechanism include at least one locating pin and at least one bushing.

21. The robot assembly of claim 18, wherein:

said docking assembly includes a swing arm, and said swing arm is rotated into contact with said sensor assembly to secure said sensor assembly to said docking assembly.

22. The robot assembly of claim 17, wherein said gripper assembly includes first and second opposing jaws, said first and second opposing jaws configured to engage said at least one of the work tool and robotic arm.

23. The robot assembly of claim 22, further comprising:

a first mating feature secured to at least one of the work tool and robotic arm;

a second mating feature secured to at least one of said first and second opposing jaws; and wherein said first mating feature is configured to engage said second mating feature when said first and second opposing jaws engage at least one of said work tool and robotic arm, thereby fixing said sensor assembly in a predetermined registration with respect to said robotic arm.

24. The robot assembly of claim 23, further comprising a collar assembly secured to at least one of said work tool and robotic arm, said collar assembly including said first mating feature.

25. The robot assembly of claim 23, wherein said first mating feature and said second mating feature comprise a pin and a pin receiving hole.

26. The robot assembly of claim 22, wherein:

said gripper assembly further comprises a pneumatic actuator coupled to said first and second opposing jaws, said pneumatic actuator operable to cause said first and second opposing jaws to alternately couple to and decouple from said at least one of the work tool and said robotic arm.

27. The robot assembly of claim 17, wherein said sensor further comprises an optical sensor.

* * * * *